No. 788,576. PATENTED MAY 2, 1905.
C. E. BILLIN.
SELF OILING TRUCK AXLE.
APPLICATION FILED MAR. 31, 1904.
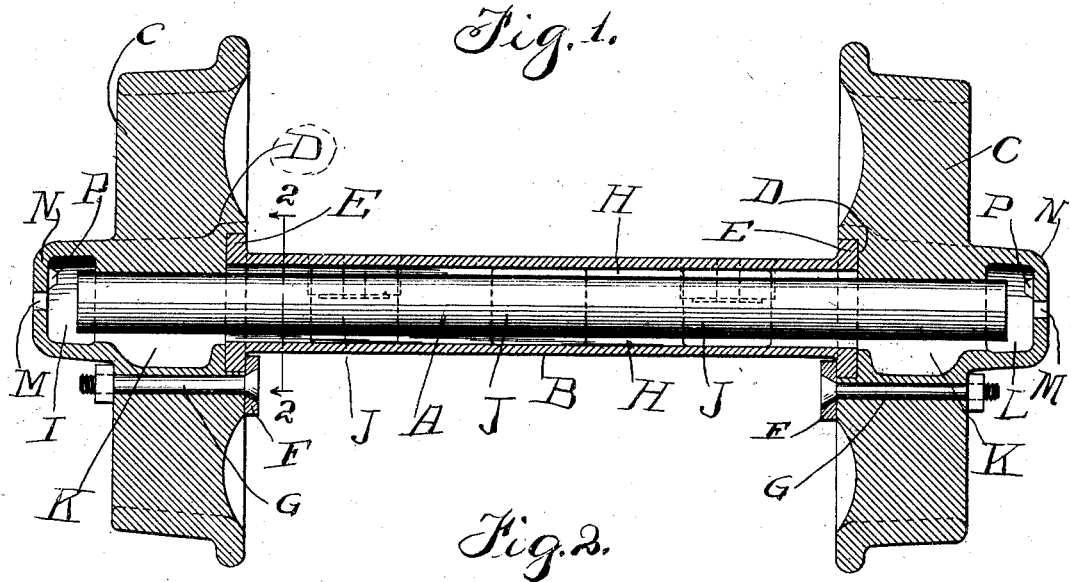
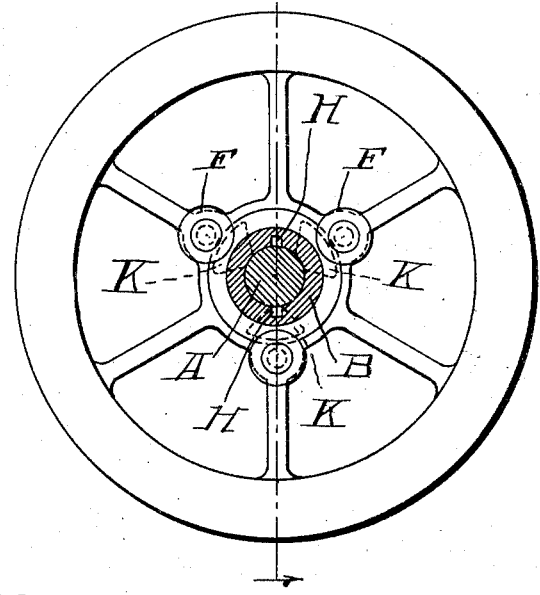
Witnesses
J. B. Weir
Oliver J. Plumtree
Inventor:
Charles Emery Billin
By Brown & Darby
Attys No. 788,576.

Patented May 2, 1905.

UNITED STATES PATENT OFFICE.

CHARLES EMERY BILLIN, OF CHICAGO, ILLINOIS.

SELF-OILING TRUCK-AXLE.

SPECIFICATION forming part of Letters Patent No. 788,576, dated May 2, 1905.

Application filed March 31, 1904. Serial No. 200,875.

*To all whom it may concern:*

Be it known that I, CHARLES EMERY BILLIN, a citizen of the United States, residing at Chicago, in the county of Cook and State of Illinois, have invented a new and useful Self-Oiling Truck-Axle, of which the following is a specification.

This invention relates to self-oiling truck-axles.

The object of the invention is to provide a construction of truck-axle which secures efficient lubrication and which is simple and efficient in operation.

Other objects of the invention will appear more fully hereinafter.

The invention consists, substantially, in the construction, combination, location, and relative arrangement of parts, all as will be more fully hereinafter set forth, as shown in the accompanying drawings, and finally pointed out in the appended claims.

Referring to the accompanying drawings and to the various views and reference-signs appearing thereon, Figure 1 is a view in section lengthwise of a truck-axle and illustrating a construction embodying the principles of my invention, the plane of section being indicated by reference-signs 1 1, Fig. 2, looking in the direction of the arrows. Fig. 2 is a view in transverse section on the line 2 2 of Fig. 1, looking in the direction of the arrows.

In the construction of trucks, especially in the construction of trucks employed for mine haulage or similar use, difficulty has been experienced in truck constructions wherein the truck-wheels are mounted loosely upon the axles, and in constructions where the truck-wheels are mounted upon to rotate with the axle difficulty has been experienced in securing efficient lubrication of the axle in the bearings within which it rotates.

It is among the special purposes of my present invention to provide a construction of truck-axle and arrangement thereof which is simple, wherein provision is made for mounting the truck-wheels loosely upon the ends of the axle, wherein the axle-bearings are efficiently lubricated, and a construction which is strong and durable and capable of the rough usage to which mine-haulage trucks and trucks employed for similar purposes are subjected.

In carrying out my invention I employ an axle A in the form of a cylindrical solid rod of the desired length, and I arrange the same to extend transversely and loosely through a sleeve B, the ends of the axle projecting beyond the ends of such sleeve. Upon the projecting ends of the axle I mount the truck-wheels C. Each truck-wheel is provided on the inner face thereof with an annular shoulder or recess D to receive and form a seat for a lateral flange E on the end of sleeve B, the wheels being retained in position in any suitable or convenient manner—as, for instance, by means of washers F, carried by bolts G, extending through the wheels, said washers F engaging over the inner surface of the flanges E, as clearly shown in the drawings. Any desired number of retaining-washers F and securing-bolts G therefor may be employed. While, therefore, I have shown three of such washers and securing-bolts for each wheel, it is obvious that any other desired number thereof may be employed. The truck-body is designed to be supported upon the sleeve B in the usual or any well-known or convenient manner. (Not shown.) The sleeve B is provided throughout its length thereof with longitudinal channels H, and at suitable intervals throughout the length of sleeve B said sleeve may be cored out to form annular recesses or chambers, (indicated at J.) Any desired number of such chambers may be employed. Each truck-wheel is provided in the hub thereof, which receives the projecting end of the axle, with recesses or chambers K, spaced a suitable distance apart and arranged at different points peripherally around the axle M. Each of the chambers K of each wheel is in free communication with a cup-chamber L, formed, preferably, centrally in the outer face of the wheel by suitably coring out an integral extension of the metal of the wheel. This extension is provided with an opening M centrally therethrough and preferably in the axial line of the axle to afford means for introducing a lubricant in the cup-chamber L and thence into the recesses or chambers K. From the chambers K the lubricant enters the longitudinal passages H of sleeve B and into the circumferential spaces J, thus affording a most simple and efficient lubricating means for the axle. If desired and in order to prevent the axle A from shifting longitudinally too far in one direction or the other, the wheel-hub extensions N, in which chambers L are formed, may be provided on the inside surface thereof with a lug P to form a stop to limit any endwise movement of the axle A.

It is obvious that many variations and changes in the details of construction and arrangement would readily occur to persons skilled in the art and still fall within the spirit and scope of my invention. The construction shown, however, is simple and efficient and economical of manufacture and affords a most efficient self-lubricating axle construction.

Having now set forth the object and nature of my invention and a construction embodying the principles thereof, what I claim as new and useful and of my own invention, and desire to secure by Letters Patent, is—

1. The combination of a bearing-sleeve, an axle extending through such sleeve and having its ends projecting beyond the ends of such sleeve, truck-wheels received upon the projecting ends of the axle and each provided with a lubricating-chamber in the hub thereof, and a lubricating-passage formed in the inner surface of said sleeve and to which said lubricating-chamber delivers, said passage extending from the wheel at one end of the sleeve to the wheel at the other end of the sleeve, as and for the purpose set forth.

2. The combination of a sleeve having longitudinal grooves, and circumferential or annular recesses formed in the interior surface thereof, a solid rod extending through such sleeve and having its ends projecting beyond the ends of such sleeve and forming an axle, truck-wheels mounted upon the projecting ends of the axle, and having chambers formed in the hub thereof, said chambers arranged to deliver into said longitudinal grooves, as and for the purpose set forth.

3. The combination with a sleeve having longitudinal grooves on its inner surface and an annular flange at each end thereof, an axle extending longitudinally through such sleeve and having the ends thereof projecting beyond the ends of such sleeve, truck-wheels mounted upon the projecting ends of such axle and having chambers formed in the hub thereof, said chambers arranged to deliver into said grooves, and means carried by the wheels arranged to engage the annular flanges on said sleeve to retain such wheels in place, as and for the purpose set forth.

4. The combination with a sleeve having longitudinal grooves in its inner surface and having annular flanges at the ends thereof, an axle extending longitudinally through said sleeve and having the ends thereof projecting beyond the ends of said sleeve, truck-wheels mounted upon the projecting ends of the axle and having chambers formed in the hub thereof, said chambers arranged to deliver into said grooves, said wheels having a seat formed on the inner faces thereof to receive said annular flange, and a washer carried by each of said wheels and arranged to engage over the inner face of the flange at the respective ends of the sleeve to retain the wheels in place, as and for the purpose set forth.

5. The combination with a sleeve having lubricating-passages formed longitudinally upon the inner surface thereof, an axle extending longitudinally through such sleeve and having its ends projecting beyond the ends thereof, truck-wheels mounted upon the projecting ends of the axle, said truck-wheels provided with cored-out extensions at the hubs thereof to form lubricating-chambers, there being recesses formed in the wheel-hubs communicating with said chambers and delivering into the longitudinal passages in said sleeve, and means for connecting said wheels to said sleeve, as and for the purpose set forth.

In witness whereof I have hereunto set my hand, this 26th day of March, 1904, in the presence of the subscribing witnesses.

CHARLES EMERY BILLIN.

Witnesses:
C. H. SEEM,
S. E. DARBY.